United States Patent [19]

Braid

[11] 4,240,958
[45] Dec. 23, 1980

[54] PROCESS OF PREPARING SULFURIZED OLEFINS

[75] Inventor: Milton Braid, Westmont, N.J.

[73] Assignee: Mobil Oil Corporation, New York, N.Y.

[21] Appl. No.: 971,602

[22] Filed: Dec. 20, 1978

[51] Int. Cl.³ ............................................. C07G 17/00
[52] U.S. Cl. ..................................... 260/139; 252/45; 252/78.1; 260/125
[58] Field of Search ................. 252/45, 78.1; 260/125, 260/139

[56] References Cited

U.S. PATENT DOCUMENTS

| | | | |
|---|---|---|---|
| 2,768,157 | 10/1956 | Cashman et al. | 260/139 |
| 3,231,558 | 1/1966 | McMillen | 252/45 X |
| 3,644,282 | 2/1972 | Bresson | 252/404 X |
| 3,652,495 | 3/1972 | Dean | 252/404 X |
| 3,873,454 | 3/1975 | Horodysky et al. | 252/45 X |
| 3,925,414 | 12/1975 | Landis et al. | 252/45 X |
| 3,944,539 | 3/1976 | Horodysky et al. | 260/139 |
| 4,090,970 | 5/1978 | Braid | 252/42.7 |

*Primary Examiner*—Andrew Metz
*Attorney, Agent, or Firm*—Charles A. Huggett; Howard M. Flournoy

[57] ABSTRACT

A process wherein a sulfur halide and an olefin reacted in the presence of catalytic amounts of iodine provides an increased yield of an intermediate adduct with high olefin to sulfur halide ratio; said adduct is thereafter sulfurized with a metal sulfide to provide increased yield of a sulfurized olefin and, when a minor amount of sulfur halide is added to the adduct prior sulfurizing, a substantially increased yield of sulfurized olefin highly useful as a lubricant additive having improved copper corrosion properties is provided.

11 Claims, No Drawings

PROCESS OF PREPARING SULFURIZED OLEFINS

BACKGROUND OF THE INVENTION

1. Field of the Invention

This application is directed to novel sulfurized olefinic compounds and lubricant compositions thereof having inter alia improved copper corrosion properties. This application in more particularly aspects is also directed to a novel process or processes for making such compounds.

2. Description of the Prior Art

It is known to use mixtures of sulfur containing compounds, e.g., diesters of thiodicarboxylic acids and hindered phenols to stabilize organic polymers against exposure to light and air; U.S. Pat. No. 3,644,282 and U.S. Pat. No. 3,652,495. It is also known to use organo sulfur containing transition metal complexes for lubricating oils and for various other organic media, see for example U.S. Pat. No. 4,090,970. Polysulfides, e.g., polydisulfides of the type contemplated herein are obtained, for example, by reacting isobutylene and a sulfur halide and as disclosed in U.S. Pat. No. 3,873,454 and U.S. Pat. No. 3,925,414 are useful as extreme pressure and antiwear additives for lubricant compositions.

SUMMARY OF THE INVENTION

This application, however, is directed to the discovery that compositions of the type described in U.S. Pat. Nos. 3,873,454 and 3,925,414 having not only extreme pressure and anti-wear properties but also having improved copper corrosion properties are provided when the sulfurized reaction product of a sulfur monohalide and a $C_2$ to $C_{20}$ olefin produced by the hereindescribed process are added in minor effective amounts to various media of lubricating viscosity. The novel method of producing said reaction product is catalyzed in the sulfur halide-olefin addition step described below by the presence of minor amounts of iodine which provides an adduct having a higher olefin to sulfur halide ratio and an increased adduct yield. The adduct so produced (1) may then be sulfurized with an alkali metal sulfide or (2) after separation of unreacted olefin and removal from the reaction zone, mixed with a minor amount of the sulfur monohalide and then sulfurized with alkali metal sulfide to provide the final sulfurized olefinic product. The iodine catalyst as stated above provides increased conversion to the adduct which after sulfurization affords a lubricant additive in increased yield and with improved copper corrosion properties. When the iodine catalyzed adduct of this process is mixed with additional minor amounts of the sulfur halide prior to sulfurization, an additive having acceptable and improved oil solubility, in contrast to poorly soluble products from adducts of the prior art, and greatly improved odor as well as the aforementioned improved copper corrosion properties is obtained in even higher yield.

This application accordingly is further directed to lubricant compositions comprising a major proportion of an oil of lubricating viscosity or grease prepared therefrom and a minor proportion of the aforedescribed additives.

DESCRIPTION OF SPECIFIC EMBODIMENTS

In general the olefin-sulfur halide reaction takes place at ambient pressures and in the temperature of from about 45° to about 55° C. The sulfur halide, preferably a sulfur monohalide is placed in a suitable reaction zone and mixed with a $C_2$–$C_{20}$ olefin, preferably $C_3$ or higher, which is usually introduced into the reaction zone subsurface. Reaction is continued with sufficient external heat to maintain the desired temperature until there is no further consumption of the olefin. The adduction product is separated from the reaction medium, excess olefin is stripped therefrom and the remainder is filtered. For most operations the olefin and the sulfur halide are reacted in a mole ratio of from abot 0.5:1 to about 2.5:1. Preferred is a mole ratio of from about 1:1 to about 2:1 of olefin to sulfur halide. Preferably sulfur monohalide is used in the reaction, however, a combination of a sulfur dihalide and elemental sulfur to produce the corresponding sulfur monohalide may also be used. The preferred halide is sulfur monochloride.

Any $C_2$–$C_{20}$ olefin may be used. However, $C_3$–$C_6$ olefins are preferred, with $C_4$, isobutylene being most preferred. The olefins accordingly may have straight or branched chains.

As stated hereinabove the reaction of the olefin and the sulfur monohalide is catalyzed by the presence of a minor amount of iodine. The iodine is usually dissolved in the sulfur monohalide prior to passing the olefin sub-surface into the reaction zone. The amount of iodine catalyzed used in this process varies from about 0.025% to about 5% by weight based on the weight of sulfur monohalide. The preferred amount of iodine is from about 0.05% to about 3.0%, most preferred is about 0.1%.

After the iodine-catalyzed adduct is separated, freed from unreacted olefin and recovered it may then be sulfurized with an alkali metal halide or mixed with a minor amount of sulfur monohalide, i.e., from about 2 to 10% by weight, and then sulfurized with the alkali metal sulfide which affords yields of the final additive far in excess of the yields obtained when the additional sulfur monohalide is not used.

In general the sulfurization is a straight-forward process wherein alkali metal sulfide in a non-reactive medium, such as a lower alcohol and water mixture, is slowly reacted with the adduct prepared as per above. An aqueous layer and an organic layer are present after sulfurization. The aqueous layer is removed and the organic layer is washed with water, dried and stripped of solvent leaving the sulfurized olefin.

Any suitable alkali metal sulfide may be used. However, sodium sulfide or potassium sulfide are preferred. Also may suitable non-reactive co-solvent partner may be used with water, e.g., lower alcohols such as methanol, ethanol, propanol, 2-propanol and the like or such solvents as the ether-alcohols, e.g., Carbitol or Cellosolve.

The molar ratio of alkali metal sulfide to adduct in the sulfurization step is generally from about 0.8:1 to about 3.5:1.

The additives prepared in accordance herewith are effective in the standard conventional amounts usually used, that is, comprising from about 0.01 to about 5% by weight of the total composition; with the lubricant or other oleaginous media comprising the remainder of the composition along with any other additives normally used in such compositions, such as in the case of lubricants, other extreme pressure or antiwear agents, viscosity control agents, detergents and antioxidants.

This applicatiion in its preferred embodiments is directed to lubricant compositions comprising a major amount of an oil of lubricating viscosity, or greases prepared therefrom and a minor amount of the hereindescribed additives sufficient to improve the aforementioned extreme pressure, anti-copper corrosivity and antiwear properties of said lubricant compositions.

The compositions hereof may comprise any oleaginous materials that require lubricative properties under extreme pressure conditions and require protection against excessive wear under operating conditions but normally exhibit insufficient anti-corrosion properties. Especially suitable for use with the additives of this invention are liquid hydrocarbon oils of lubricating viscosity. Lubricant oils, improved in accordance with the present invention, may be of any suitable lubricating viscosity. In general the lubricant compositions may comprise any mineral or synthetic oil of lubricating viscosity. The additives of this invention are especially useful in greases and in automotive fluids such as brake fluids, and power brake fluids, transmission fluids, power steering fluids, various hydraulic fluids and gear oils.

In instances where synthetic oils are desired in preference to refined petroleum or mineral oils they may be employed alone or in combination with a mineral oil. They may also be used as the vehicle or base of grease compositions. Typical synthetic lubricants include polyisobutylene, polybutenes, hydrogenated polydecenes, polypropylene glycol, polyethylene glycol, trimethylolpropane esters, neopentyl and pentaerythritol esters of carboxylic acids, di(2-ethylhexyl) sebacata, di(2-ethylhexyl) adipate, dibutyl phthalate, fluorocarbons, silicate esters, silanes, esters of phosphorous-contining acids, liquid ureas, ferrocene derivatives, hydrogenated mineral oils, chain-type polyphenols, siloxanes and silicones (polysiloxanes), alkyl-substituted diphenyl ethers typified by a butyl-substituted bis(p-phenoxy phenyl) ether, phenoxy phenyleters, dialkylbenzenes etc.

As hereinbefore indicated, the aforementioned additives can be incorporated as additives in grease compositions. When high temperature stability is not a requirement of the finished grease, mineral oils having a viscosity of at least 40 SSU at 150° F. are useful. Otherwise those falling within the range of from about 60 SSU to about 6,000 SSU at 100° F. may be employed. The lubricating compositions of the improved greases of the present invention, containing the aove-described additives, are combined with a grease-forming quantity of a thickening agent. For this purpose, a wide variety of materials can be dispersed in the lubricating oil in grease-forming quantities in such degree as to impart to the resulting grease composition the desired consistency. Exemplary of the thickening agents that may be employed in the grease formulation are metal soaps as well as non-soap thickeners, such as surface-modified clays and silicas, aryl ureas, calcium complexes and similar materials. In general, grease thickeners are employed which do not melt or dissolve when used at the required temperature within a particular environment; however, in all other respects, any material which is normally employed for thickening or gelling oleaginous fluids or forming greases may be used in the present invention.

The following examples are intended to exemplify the hereinembodied invention and in no way limit the scope thereof.

EXAMPLE 1

Addition of Sulfur Monochloride to Isobutylene; No Iodine Catalyst

Sulfur monochloride, 7.5 moles (1014.1 .), was charged into a suitable reaction flask equipped with a stirrer and a sub-surface gas sparger. Thereafter, isobutylene bubbled through methanol was passed into the reaction flask while stirring at a temperature of about 27° C. via said gas sparger. By carefully regulating the rate of olefin addition the temperature was at or close to 53° C. After a total addition time of 16.5 hr., there was no further consumption of the olefin. Excess dissolved olefin was stripped from the reaction product by heating at 50° C. under reduced pressure and the adduction product was then filtered. 1490 grams of clear reddish oil were obtained. This represented 1469 grams of product per kolgram of sulfur monochloride.

EXAMPLE 2

Addition of Sulfur Monochloride to Isobutylene; Iodine Catalyst

Iodine (1 g.), was dissolved in sulfur monochloride (1032 g.) and isobutylene (total 795 g.) was passed into the stirred solution sub-surface through a gas dispersion tube at such a rate as to control the temperature at 45°–55° C. After a total of 20.5 hr. there was no further uptake of the olefin. The excess dissolved olefin was distilled from the adduction product to a pot temperature of 60° C. under reduced pressure and the residue was filtered. Obtained were 1598 g. of adduction product, a reddish clear oil, representing 1548 g. of product per kilogram of sulfur monochloride.

EXAMPLE 3

Addition of Sulfur Monochloride to Isobutylene, Iodine Catalyst

Following the procedure of Example 2 isobutylene (total 763 g.) was passed sub-surface through a gas dispersion tube into sulfur monochloride (1007 g.) containing dissolved iodine (1 g.) during a total of 16.5 hr. while stirring at 45°–55° C. At the end of this period the unreacted olefin was stripped at a pot temperature of 60° C. under reduced pressure and filtered. There were obtained 1576 g. of the adduction product, a light reddish oil, representing 1565 g. of adduction product per kilogram of sulfur monochloride.

EXAMPLE 4

Sulfurization of Isobutylene-Sulfur Monochloride Adduct-No iodine catalyst

To a mixture of sodium sulfide (400 g.), water (500 ml) and 2-propanol (60 ml) stirred at 30°–40° C. there was added during 0.5 hr. the isobutylene-sulfur monochloride adduct of Example 1 (400 g.). The resulting reaction mixture was stirred at reflux for an additional 5.5 hr and 100 ml. of distillate was then removed. The remaining reaction mixture was cooled to 50° C. and n-hexane (500 ml) was added. After stirring for 0.5 hr., the aqueous layer of the reaction mixture was removed and the organic layer was washed with water, dried, and stripped of solvent. The sulfurized olefin product remained as a dark amber oil (271 g.).

EXAMPLE 5

Sulfurization of Isobutylene-Sulfur Monochloride Adduct-Iodine catalyst

As described in Example 4, the isobutylene-sulfur monochloride adduct of Example 3 (400 g.), was added with stirring during 0.5 hr. to a mixture of sodium sulfide (400 g.), water (400 ml) and 2-propanol (60 ml), the mixture was then heated at reflux (80°–90° C.) for an additional reaction period of four hours. After work-up, the sulfurized olefin product was obtained as a clear dark amber oil (277 g.).

EXAMPLE 6

Sulfurization of Isobutylene-Sulfur Monochloride Adduct (no iodine catalyst) in Combination with Added Sulfur Monochloride Following the procedure of Example 4, a mixture of the isobutylene-sulfur monochloride adduct of Example 1 (400 g.) and sulfur monochloride (8 g.) was added during 0.5 hr. to a mixture of sodium sulfide (400 g.), water (500 ml) and 2-propanol (60 ml) and stirred at 30°–40° C. During the addition the heat of reaction increased the temperature to about 50° C. External heating was used to heat the reaction mixture at reflux for an additional 4 hr. reaction period. After work-up, benzene (200 ml) was used to assist separation of the organic layer during washing. A light amber colored moderately viscous oil (269 g.) was obtained. This product gave a very hazy solution at 3.5% by weight concentration in 200 second solvent refined paraffinic neutral petroleum base stock of lubricating viscosity.

EXAMPLE 7

Sulfurization of Isobutylene-Sulfur Monochloride Adduct (iodine catalyst) in Combination with Added Sulfur Monochloride Following the procedure of Example 4, a mixture of the isobutylene-sulfur monochloride adduct of Example 3 (400 g.) and sulfur monochloride (8 g.) was added during 0.5 hour to a mixture of sodium sulfide (440 g.), water (400 ml), and 2-propanol (60 ml) while stirring. After the addition was complete, the mixture was heated at reflux for an additional 4 hours. After work-up, the sulfurized olefin was obtained as a dark amber moderately viscous clear oil (295 g.). At a concentration of 3.5% by weight, this product was completely soluble (clear solution) in 200 second solvent refined paraffinic neutral petroleum base stock of lubricating viscosity.

TABLE 1

| | Isobutylene-Sulfur Monocholoride Adduct[1] | | | | | | |
|---|---|---|---|---|---|---|---|
| Ex. | Reaction Temp., °C. | Reaction Time,[2] Hr. | Olefin Charged,[3] g. | Sulfur Monochloride, g. | Catalyst g.(Wt. % of sulfur halide) | Adduct g | Grams of Adduct per Kg. of $S_2Cl_2$ Reactant |
| 1 | 45–55 | 16.5 | 780 | 1014 | Methanol (dissolved in saturated olefin vapor) | 1490 | 1469 |
| 2 | 45–55 | 20.5 | 795 | 1032 | Iodine, 1.0 g.(0.097) | 1598 | 1548 |
| 3 | 45–55 | 16.5 | 763 | 1007 | Iodine, 1.0 g.(0.099) | 1576 | 1565 |

[1]Intermediate for sulfurized isobutylene additive.
[2]Time required to saturate the reaction mixture with olefin; reaction temperature controlled by rate of olefin input.
[3]Saturation manifested by continued refluxing of isobutylene in dry ice - cooled condenser without eventual consumption by reaction.

TABLE 2

| | | Sulfurization of Isobutylene-Sulfur Monochloride Adduct | | | | | | | | |
|---|---|---|---|---|---|---|---|---|---|---|
| Additive | Adduct Ex. (400 g.) | Sulfur Monochloride mixed with adduct | | Sulfurized Product g. | Solubility Rating[3] | % C | % H | % S | Cu Strip. Corr.[4] | Performance Rating[5] |
| | | g. | Wt. % | | | | | | | |
| Ex. 4 | Ex. 1[1] | None | — | 271 | Clear | | | | | |
| Ex. 5 | Ex. 3[2] | None | — | 277 | Clear | 35.8 | 5.88 | 46.6 | 3B | 26.8 |
| Ex. 6 | Ex. 1[1] | 8 | 2 | 269 | V.Hazy | 34.5 | 5.11 | 49.1 | 3B | 28.7 |
| Ex. 7 | Ex. 3[2] | 8 | 2 | 295 | Clear | | | 47.7 | 2B | 28.1 |
| | | | | | | 39.1 | 6.68 | 47.3 | | |

[1]No iodine
[2]Iodine catalyst
[3]Sulfurized olefin product 3.5% by weight in solvent refined paraffinic neutral mineral oil of lubricating viscosity
[4]3 wt. % in solvent refined mineral oil; 6 hours at 212° F.
[5]Infrared specific absorbance test which correlates with extreme pressure performance in the L-42 Gear Oil Test, i.e., U.S. Federal Standards Test 791A; minimum passing rating, 26.

The data of the Tables are indicative of the improvement in the art which is obtained as a result of the instant process. Namely, (1) improved yield of the intermediate adduct, (2) improved conversion of the adduct to the sulfurized olefinic additive, (3) substantial improvement in yield of the sulfurized olefin by use of minor amounts of sulfur halide added to the adduct prior to sulfurization and (4) improved copper corrosion properties. Table 1 illustrates the improved yields of adduct obtainable when an iodine catalyst in accordance with the invention is used. For example, the yield of Example 1 prepared without iodine catalyst was 1469 grams of adduct per kilogram of sulfur monochloride reactant as compared to Example 3 prepared with iodine catalyst which was 1565 grams of adduct per kilogram of sulfur monochloride. Table 2 illustrates the improved yield of sulfurized olefinic product and copper anticorrosivity properties thereof.

It is understood that departures from the preferred embodiments can be effectively made and are within the scope of this specification.

What is claimed is:

1. A process for preparing a sulfurized olefinic compound comprising reacting a $C_2$–$C_{20}$ olefin and a sulfur halide in the presence of a catalytic amount of iodine, separating the intermeiate adduct thus produced from the reaction medium and thereafter sulfurizing it with an alkali metal sulfide.

2. A process as defined in claim 1 wherein said adduction reaction is conducted at a temperature of from about 45° to 55° C.

3. A process as dfined in claim 2 wherein said reaction is carried out in the presence of from about 0.025 to about 5 percent by weight of iodine, based on the weight of sulfur halide.

4. A process as defined in claim 3 wherein about 0.1 percent by weight of iodine is present.

5. A process as defined in claims 1, 2 or 3 wherein the olefin and the sulfur halide are reacted in a mole ratio of from about 0.5:1 to about 2.5:1.

6. A process as defined in claims 1, 2 or 4 wherein the olefin and the sulfur halide are reacted in a mole ratio of from about 1:1 to about 2:1.

7. A process as defined in claims 1, 2 or 3 wherein the olefin is isobutylene and the sulfur halide is a sulfur monohalide.

8. A process as defined in claim 7 wherein the sulfur halide is sulfur monochloride.

9. A process as defined in claims 1, 2, 4 or 8 wherein said alkali metal sulfide is sodium sulfide.

10. A process wherein said adduct prepared as in claims 1, 2 or 7 after removal from the reaction mixture and separation of unreacted olefin is mixed with an additional minor amount of said sulfur halide and thereafter sulfurized with alkali metal sulfide.

11. A process as defined in claim 10 wherein said olefin is isobutylene, said sulfur halide is sulfur monochloride and said alkali metal sulfide is sodium sulfide.

* * * * *

UNITED STATES PATENT AND TRADEMARK OFFICE
CERTIFICATE OF CORRECTION

PATENT NO. : 4,240,958

DATED : December 23, 1980

INVENTOR(S) : Milton Braid

It is certified that error appears in the above-identified patent and that said Letters Patent are hereby corrected as shown below:

| | |
|---|---|
| Col. 2, line 10 | "abot" should read --about-- |
| Col. 2, line 50 | "may" should read --any-- |
| Col. 3, line 31 | "sebacata" should read --sebacate-- |
| Col. 3, line 49 | "aove" should read --above-- |
| Col. 4, line 6 | "(1014.1 )" should read --(1014.1 g)-- |
| Col. 7, Claim 3 | "dfined" should read --defined-- |

Signed and Sealed this

Twelfth Day of May 1981

[SEAL]

*Attest:*

RENE D. TEGTMEYER

*Attesting Officer*   *Acting Commissioner of Patents and Trademarks*